US011722529B2

United States Patent
Eftekhari Roozbehani et al.

(10) Patent No.: US 11,722,529 B2
(45) Date of Patent: *Aug. 8, 2023

(54) METHOD AND APPARATUS FOR POLICY-BASED MANAGEMENT OF ASSETS

(71) Applicant: IRDETO B.V., Hoofddorp (NL)

(72) Inventors: Yaser Eftekhari Roozbehani, Ottawa (CA); Clifford Liem, Ottawa (CA)

(73) Assignee: Irdeto B.V., Hoofddorp (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,360

(22) Filed: Feb. 8, 2022

(65) Prior Publication Data

US 2022/0166802 A1 May 26, 2022

Related U.S. Application Data

(63) Continuation of application No. 16/022,020, filed on Jun. 28, 2018, now Pat. No. 11,316,898.

(Continued)

(51) Int. Cl.
*H04L 9/40* (2022.01)
*H04W 12/08* (2021.01)
(Continued)

(52) U.S. Cl.
CPC .............. *H04L 63/20* (2013.01); *H04L 9/085* (2013.01); *H04L 9/0825* (2013.01); *H04L 9/30* (2013.01);
(Continued)

(58) Field of Classification Search
CPC ....... H04L 63/20; H04L 63/10; H04L 9/3268; H04L 9/30; H04L 9/085; H04L 9/0825; H04W 12/08; H04W 12/005
See application file for complete search history.

(56) References Cited

U.S. PATENT DOCUMENTS

2003/0233549 A1* 12/2003 Hatakeyama ....... H04L 63/0428
713/176
2010/0151822 A1* 6/2010 Medvinsky ........... H04W 12/08
455/410
(Continued)

OTHER PUBLICATIONS

Busold, C, et al., "Smart Keys for Cyber-Cars: Secure Smartphone-based NFC-enabled Car Immobilizer." Proceedings of the third ACM Conference on data and application and privacy. CODASPY '13, Jan. 1, 2013, pp. 233-235, XP055500712.
(Continued)

*Primary Examiner* — Mohammed Waliullah
(74) *Attorney, Agent, or Firm* — Rimon PC; Marc S. Kaufman

(57) ABSTRACT

A method and system for managing shared use of an asset. An asset device and an owner device accomplish an initial setup procedure to register the owner with the asset. One or more secure policies are then sent from the owner device, or another device authorized to create policies, to one or more user devices. The policies express user conditions and limitations for using the asset. Subsequently, the user device transmits the secure policy to the asset device. Once the policy has been transferred from the user device to the asset device, user associated with the user device can request use of the asset and will be granted the requested use if the requested use is permitted by the policy.

18 Claims, 8 Drawing Sheets

Related U.S. Application Data

(60) Provisional application No. 62/606,146, filed on Jan. 8, 2018.

(51) Int. Cl.
    *H04L 9/08*           (2006.01)
    *H04L 9/30*           (2006.01)
    *H04L 9/32*           (2006.01)
    *H04W 12/60*        (2021.01)

(52) U.S. Cl.
    CPC ............ *H04L 9/3268* (2013.01); *H04L 63/10* (2013.01); *H04W 12/08* (2013.01); *H04W 12/60* (2021.01)

(56) References Cited

U.S. PATENT DOCUMENTS

| | | | |
|---|---|---|---|
| 2013/0325521 A1 | 12/2013 | Jameel et al. | |
| 2015/0210287 A1* | 7/2015 | Penilla ................ | G06F 3/04842 701/49 |
| 2015/0365293 A1* | 12/2015 | Madrigal ............ | H04L 41/0893 709/221 |
| 2018/0026949 A1* | 1/2018 | Kimn .................... | H04L 9/0827 713/156 |

OTHER PUBLICATIONS

International Search Report for Application No. PCT/IB2019/000036 dated Apr. 29, 2019.

\* cited by examiner

METHOD AND APPARATUS FOR POLICY-BASED MANAGEMENT OF ASSETS

CROSS-REFERENCE TO RELATED APPLICATION

The present application is a continuation of U.S. Ser. No. 16/022,020, filed Jun. 28, 2018, which claims priority to U.S. provisional patent application No. 62/606,146 filed on Jan. 8, 2018, the entire content of which is incorporated herein by reference.

BACKGROUND

The invention relates to managing and controlling access to assets based on policies. The recent concept of a "sharing economy" has resulted in many assets being shared between different entities who are sometimes otherwise unrelated. For example, it is known to share automobiles, houses and apartments, bicycles, and office space. Other examples of sharing include granting temporary access to a mailbox, vehicle, or house to delivery personnel or others requiring specific access. It is, of course, known to grant physical access to an asset through duplication of a physical key. Commercial sharing examples include AirBnB™ (lodging), ZipCar™ and Greenwheels™ (automobiles), LiquidOffice™ (office space) Vélib (bicycles) and Amazon Key™ (package delivery access to your home). Further, leasing vehicles is a longer-term sharing of a vehicle (e.g. several years). In some cases, the commercial industry is experimenting very short-term vehicle leases, e.g. a monthly basis. In another example, we could think of passengers on public transit (e.g. buses, trains) as another sharing example. Passengers are given temporary access to a train under the right conditions (e.g. the fare is paid). In yet another example, an OEM may lease equipment (e.g. trucks, agriculture equipment, mining equipment, engines) to operators based on the amount of time the equipment is running, rather than on a time-based basis.

In some instances, Near-Field Communication (NFC) badges or other tokens are used to grant access to the asset. Conventional systems of access management require significant infrastructure and are not flexible with respect to granting personalized access conditions/restrictions. For example, in the case of physical key access, it is not possible to personalize, e.g. limit to a specific time window, the access conditions to users. Analogous issues arise in granting access to computing devices or other resources.

To complicate matters, shared assets are often deployed into "hostile environments", such as situations where a potential criminal has full access to the most critical hardware components, the luxury of time for analysis and motivation driven by the large opportunity. For example, access to an office space or home provides physical access to the computing devices and other valuables therein. Attackers can have multiple objectives, including stealing the asset itself, tampering/modifying the policies which control the assets, and reverse-engineering the policy management.

There are various types of known digital solutions for sharing access to an asset between different entities. Fully connected solutions, where the asset and sharing entities need to be connected to a remote server, are not desirable mainly because in some cases connectivity of the asset to a server is not available. For example, in a vehicle sharing arrangement, the vehicle might be parked in an underground parking structure with no connectivity.

Partly connected solutions, where the asset does not require any type of network connection but the sharing entities do require such a connection, also have limitations. One main drawback of such a system is that they are difficult to scale to different providers and manufacturers. Providers and manufacturers ordinarily host their own cloud services and desire full control over their deployment. This means that a key sharing provider must integrate with the proprietary infrastructure, making it very difficult to scale to multiple providers and manufacturers. Also, such solutions usually require the entities to have the same sharing application, which is restrictive in some use cases. For example, if a vehicle owner wants to grant access to their vehicle to temporary users such as valet, the temporary users must install an application on their personal device for a limited time. This problem is compounded when, for example, a valet needs to download multiple apps to be able to access several different brands of vehicles.

Offline solutions that rely only on in-range wireless communication, such as Bluetooth or NFC, between sharing entities and the asset, rely on the fact that all users share the same cryptographic keys to the asset. Apart from being a security risk, these solutions make it very hard to create custom restrictions on different types of users of the asset.

BRIEF DESCRIPTION OF THE DRAWING

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown.

In the drawings.

DETAILED DESCRIPTION

Figure 1:
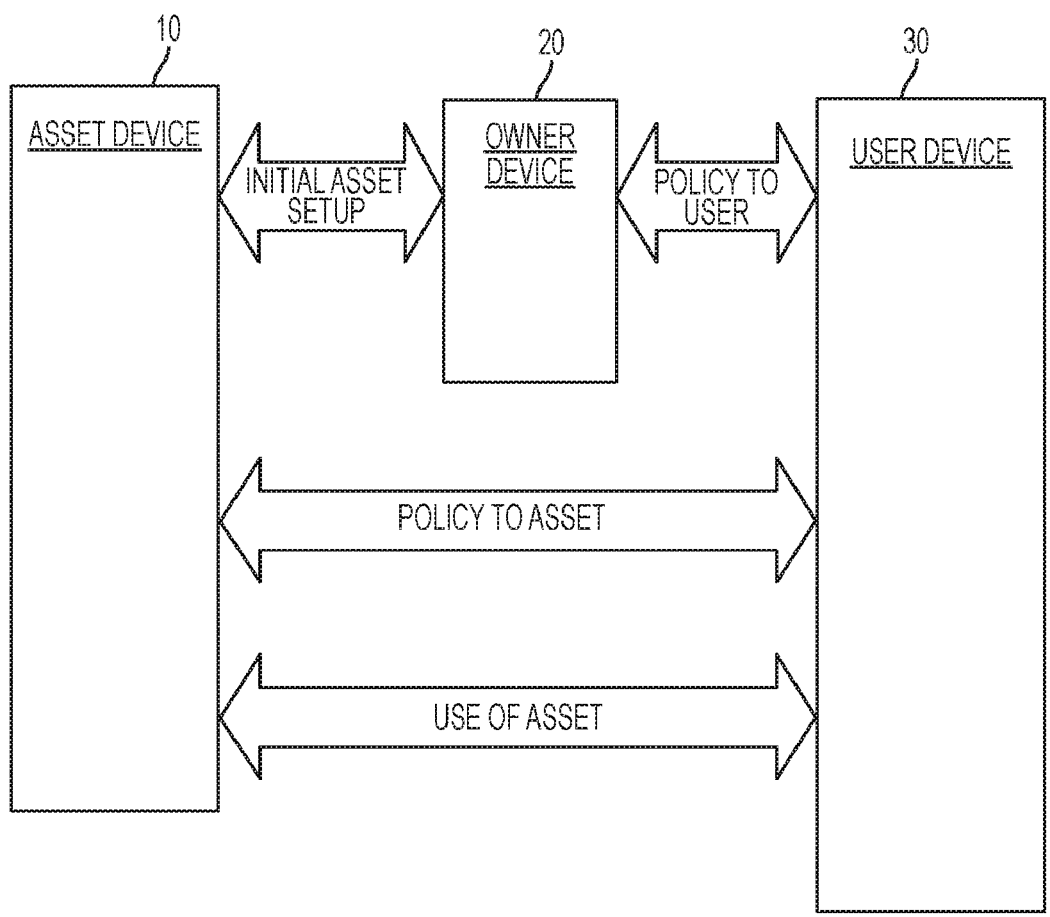
FIG. 1 is an overview schematic of a system workflow.

Certain terminology is used in the following description for convenience only and is not limiting. Unless specifically set forth herein, the terms "a," "an" and "the" are not limited to one element but instead should be read as meaning "at least one." The terminology includes the words noted above, derivatives thereof and words of similar import.

The invention provides a system and method for creating, managing, applying and enforcing policies in asset sharing environments. The invention provides a novel policy management data model, distributed computer communication architecture, and workflow which results in advantageous operation of a computer system applied to a sharing environment. The invention can be applied to many use cases including Vehicle rental: allow access to the vehicle though mobile apps. The rider can book the vehicle online with no need to go to a local office or possess a physical key. This service might also include pay as you go type of model where you just pay for the mileage and usage of the vehicle.

Personal vehicle sharing: car owner can grant access to the vehicle to his household, valet or friend.

Allowing delivery to the asset: In the case of a vehicle this could be an overnight trunk delivery. In the case of a house, this could be delivery to a mailbox. The access is granted to a member of a third party such as DHL/Amazon, etc.

Car-as-a-service (CaaS): Ride sharing of autonomous cars

Fleet management of trucks

Management of bus operators

Building access: people can get access to different floors, doors, sections of a building based on their policy. Policy can also enforce time of day and day of week access restrictions.

Smart home solutions: people can get access to mail/drop boxes for delivery, front door only, time of day/day of week access to the house, grant access to friends and family when away.

House rental and B&B: you can grant access to other people using the property. This could be used for chalets, cottages, B&B, cleaning services, and the like.

In the embodiments described herein, a policy replaces the digital/physical access keys and is distinct from the cryptographic keys used to secure the communication to the asset. In order to minimize the risk of attacks, the policy is sent protected once to the asset and enforced by the asset for every use. Policy owners are authorizing entities and can generate new policies for secondary users. The policies generated for secondary users may be restricted in number and scope by the authorizing entity. For example, a secondary user may be restricted to a speed limit and no access to the trunk. Granted policies may also include authorization policies. For instance, a vehicle owner can enable his/her teenager to generate new policies for friends may impose harsher restrictions on what the teenager can authorize.

Authorizing policy owners to generate new policies decentralizes the access management which in turn reduces the operational costs by a great extent. For instance, instead of having a facility manager granting NFC badge access to all staff, operational managers can grant access to their directly reporting staff. The embodiments support all modes of connectivity, such as: neither the asset nor the users are connected, users are connected but the asset is not, both users and asset are connected. In other words, the policy authorization and generation mechanism can be independent of the communication between entities. There need not be a main authorization broker.

The embodiments leverage public key cryptography to establish secure communication channels between devices associated with entities and devices associated with assets. In the offline mode, the embodiments can rely on physical proximity of entities involved in the communications to authenticate the public keys. In the online mode certificate authorities can validate the public keys and certificates of identity. In all modes, a policy can be tied to a unique fingerprint of the sharing entity by, for example, fetching the fingerprint of the entity or the corresponding device through a secure mechanism and utilizing it in the communication protocols.

The secure mechanism can use known white-box cryptography techniques and cloaking technologies to make it difficult for non-authorized entities to access to the fingerprint or the cryptographic keys used to secure the transactions. Cryptographic algorithms applicable to the invention include AES, HMAC, ECDH and can be realized using white-box techniques to ensure the robustness of the algorithm in a hostile environment. The cloaking technology will protect the solution from un-authorized tampering and reverse engineering. Techniques such as integrity verification, anti-debug, mathematical transformation of operation and variables and other techniques are utilized to achieve this goal. White-box cryptography and cloaking techniques are well known as taught by, for example, Michael J. Wiener, "Applying Software Protection to White-Box Cryptography", Proc. 5th Program Protection and Reverse Engineering Workshop (PPREW-5), December 2015, DOI=http://doi.acm.org/10.1145/2843859.2846054; Yuan Xiang Gu, Harold Johnson, Clifford Liem, Andrew Wajs, and Michael J. Wiener. 2016. White-box cryptography: practical protection on hostile hosts. In Proceedings of the 6th Workshop on Software Security, Protection, and Reverse Engineering (SSPREW '16). ACM, New York, N.Y., USA, Article 4, 8 pages. DOI: https://doi.org/10.1145/3015135.3015139; Stanley Chow, Phil Eisen, Harold Johnson, and Paul C. Van Oorschot, "White-box cryptography and an AES implementation", in Proceedings of the Ninth Workshop on Selected Areas in Cryptography (SAC 2002, pages 250-270. Springer-Verlag, 2002; and C. Liem, Y. Gu, and H. Johnson. "A Compiler-based Infrastructure for Software-Protection", in Proceedings of the Third ACM SIG-PLAN Workshop on Programming Languages and Analysis for Security, PLAS '08, pages 33-44, 2008. ACM. ISBN 978-1-59593-936-4.

Public key cryptography can be used to establish shared secrets between entities by using known techniques such as Whitebox ECDH (Elliptic-curve Diffie-Hellman). US Published Patent Application 20150333906A1 teaches implementations of Diffie-Hellman key agreements that resist extraction of cryptographically sensitive parameters during software execution by white-box attackers. The embodiments utilize transformed random numbers in the derivation of the public key and shared secret.

ECDH is a variation of the Diffie-Hellman protocol using elliptic curve cryptography and is an anonymous key agreement protocol that allows two parties, each having an elliptic-curve public-private key pair, to establish a shared secret over an insecure channel. This shared secret may be directly used as a key, or can be used to derive another key or set of keys. The key, or the derived key, can then be used to encrypt subsequent communications using a symmetric-key cipher. Note that in secure the transfer protocols of the embodiment, messages can be encrypted and signed. Both these operations require keys that are derived from the shared secret. Also, different keys can be used for different directions of messaging. For instance, if A wants to talk to B, A encrypts with key K_A and B uses the same key to decrypt. But B uses K_B to encrypt and A has to use that key to decrypt. In such a situation, 4 keys are required when 2 entities are involved in communications.

Secure communications after key establishment are cryptographically encrypted and signed. A "shared secret", i.e. a piece of data known only to the parties involved in a secure communication, is used to derive appropriate session keys using key derivation functions (KDF) seeded by random numbers such as a nonce. The session keys can be generated for each session to ensure maximum security. In the embodiment, the shared secret can be the out of the ECDH operation noted above. However, the shared secret can be a password, a passphrase, a big number or an array of randomly chosen bytes, for example.

Encryption/Decryption and sign/verification keys can be different based on the direction of communication. Therefore, in a bidirectional communication two sets of encryption/decryption sign/verification keys can be used, one per direction. Encryption/decryption/signing and verification can be performed using known symmetric key algorithms such as AES and HMAC. A nonce, i.e. an arbitrary number that can only be used only once, can be used to prevent replay attacks.

The embodiment has four primary functions:
Initial Setup: the owner of the asset presents itself to the asset, registering the "owner policy"
Policy Sharing: the owner can generate policies for other users, including setting restrictions for users including what they can generate as policies.
Accessing the Asset: a sharing user, including the owner, accesses the asset by authenticating him/herself to the asset.
Third Party Access: someone or something will gain limited access to the asset without having the required sharing application.

The embodiment leverages distributed networked computing devices to gather and process data in a novel manner, resulting in improved operation of the computer system. The various participating parties can have associated computing devices connected in a networked environment, such as through the internet, a mobile data system, Bluetooth, Bluetooth Low Energy (BLE) or near field communications (NFC). The discussion herein, when referring to the various parties, such as the asset "owner" can be referring to the party and/or the computing devices associated with the party, as is apparent from the context. Several examples of communication between the distributed computing devices are discussed below to illustrate the primary functions of the embodiment. In the FIGS., dashed lines represent optional communication channels and/or messages. For instance, in an offline mode the cloud portion is not necessary but could be helpful. Arrows represent a message, or other communication, between the computing devices associated with the entities connected by the arrows.

FIG. 1 illustrates a high-level workflow of an embodiment of a system for managing access to assets. Asset device 10 and owner device 20 accomplish an initial setup procedure to register the owner with the asset. Owner device 20 then can send one or more secure policies to one or more user devices 30. The policies express user conditions and limitations for using the asset. A policy can include a user fingerprint to be bound to just one user or a set of users. This will ensure policies are not transferred between entities in a non-intended manner. Subsequently, user device 30 can transmit the secure policy to asset device 10. Once the policy has been transferred from user device 30 to asset device 10, a user associated with user device 30 can request use of the asset and will be granted the requested use if the requested use is permitted by the policy. After being authenticated with the asset, user device 30 could also generate policies for other users.

Figure 2:
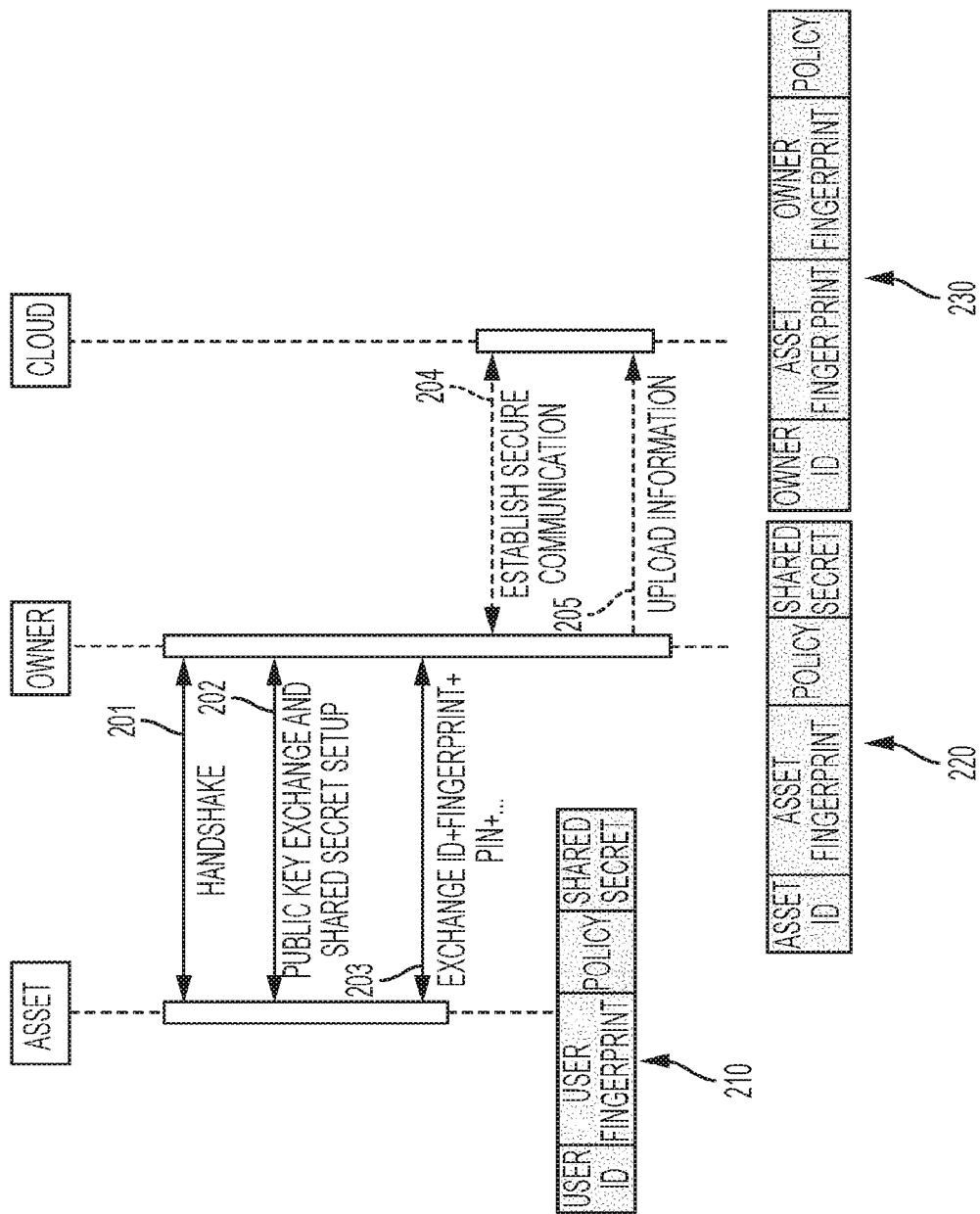
FIG. 2 is a data flow diagram of an initial asset setup operation of an embodiment.

FIG. 2 illustrates the data flow and processing of initial setup function accomplished between the asset and the owner. At 201 the asset, which is a computing device and/or has a computing device associated therewith, and the owner perform a communication handshake, to establish rules for communication, such as protocols and the like, in a known manner. For example, the handshake can establish the communication channel such as BLE, Wi-Fi, and NFC. No shared secret needs to be exchanged at this point.

At 202, public keys are exchanged between devices of the owner and the asset. In the case of using a certificate authority, public keys can be signed with a certificate of identity. Otherwise the embodiment can rely on physical proximity for public key verification. For example, the communication protocol distance limitations, e.g. Bluetooth or NFC, or a GPS position determination can be used to indicated proximity. After 202, both entities can derive a shared secret using known algorithms such as ECDH. Any communication after 202 can be protected, e.g. by cryptographically encrypting and signing the communication, using the keys, and the shared secret. Shared secrets are shared between the entities as a result of the ECDH operation, for example. However, any type of shared secret can be used, such as fingerprints (device parameters for example), recovery PIN codes and the like. At 203, sensitive information can be communicated through the secure channel. This information can include: the device fingerprint (later used for authentication), PIN codes (used to gain access in case of emergency), etc. Shared secrets can be exchanged as well since a secure channel has been established. Optionally, a secure connection can be established with a cloud based system at 204 and information of the system can be updated as 205.

210 of FIG. 2 is a schematic illustration of the data structure stored by a computing device associated with the asset. The data structure includes a user ID, a user fingerprint, access policy attributes, and the shared secret. 220 of FIG. 2 is a schematic illustration of the data structure stored by a computing device associated with the owner. The data structure includes an asset ID, an asset fingerprint, access policy attributes, and the shared secret. 230 of FIG. 2 is a schematic illustration of an optional data structure stored by the cloud system. This data structure includes the owner ID, the asset ID, the asset fingerprint, the owner fingerprint, and the policy.

The access policy attributes describe the access policy, such as permissions, time limitations, geographic limitations, identity requirements and the like. Any mechanism can be used to express the policy. For example, a grammar such as Extensible Rights Markup Language (XrML) can be used. Alternatively, a set of flags or bits can be used to indicate policy attributes that express an access policy.

The owner of an asset, or an agent thereof, can generate policies for other users. The policies can include conditions, permission, and restrictions for users. The permissions and restrictions can include restrictions and permissions under which the user can generate a policy for other users. The policies can be associated with one another in a tree-like structure.

Figure 3:
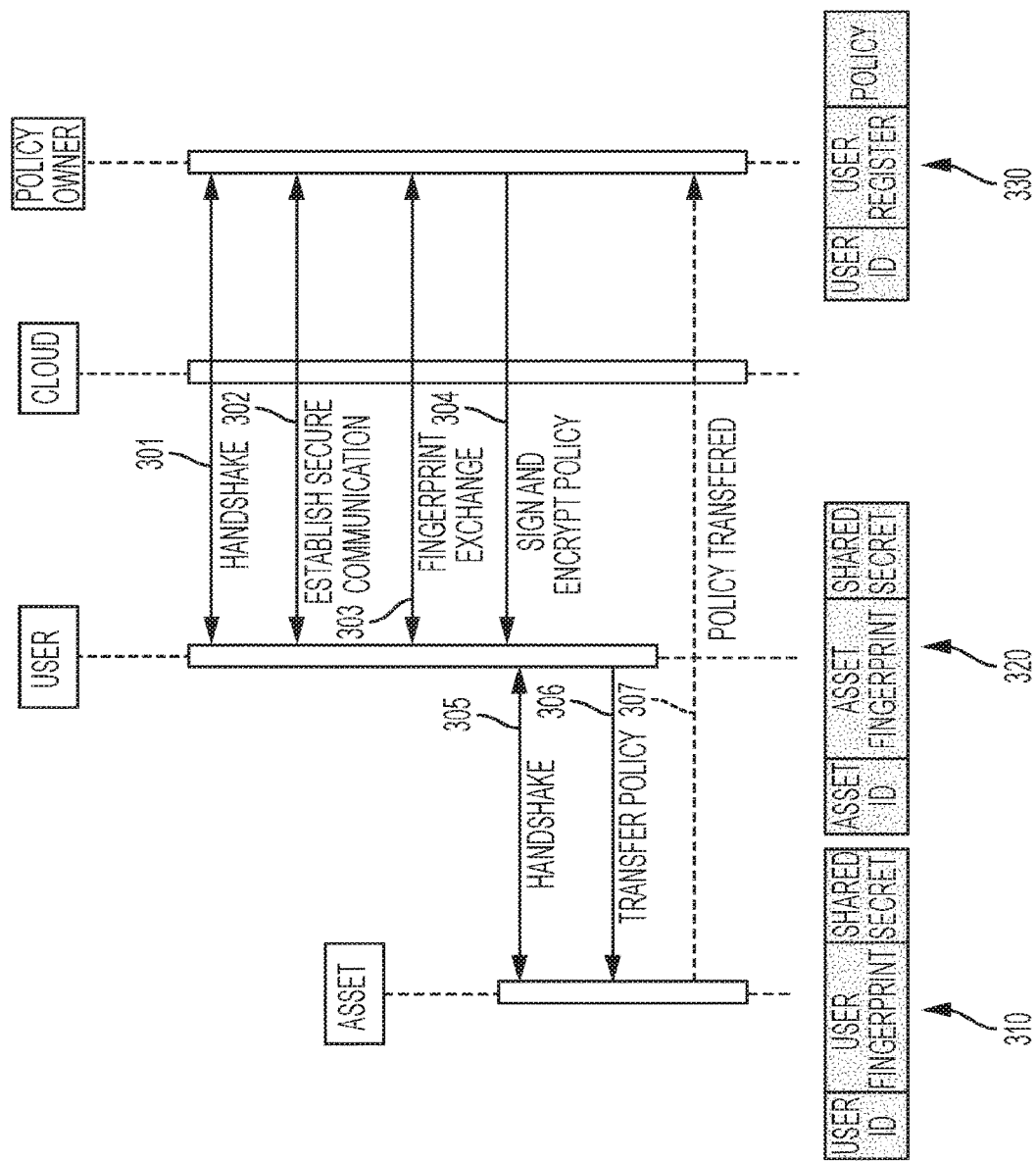
FIG. 3 is a data flow diagram of a policy transfer operation of an embodiment.

FIG. 3 illustrates the data flow and processing of a policy sharing function. This function can be split into two phases which occur in sequence: 1) the policy owner transfers a policy to the new user (301-304); and 2) the user relays the transferred policy to the asset (305-307). At 301 the user and policy owner perform a communication handshake, and at 302 these same devices establish secure communication (including, e.g. exchanging public keys, deriving/exchanging secrets, and the like). At this point a secure channel exists between computing devices associated with the two entities, owner and user. At 303, the user passes its fingerprint, encrypted and signed to the policy owner. At 304, the policy owner generates an access policy bound to the fingerprint of the new user. The policy owner can encrypt and sign the policy intended for the asset to verify and decrypt. The protected policy is passed to the new user to then relay to the asset at a later time (see 306 below). Note that "policy owner" is not necessarily the same entity as the asset owner. As noted above, policies allow entities to generate new policies. So once an entity receives a policy (from asset owner directly or indirectly through another user) the entity is able to generate policies based on the restrictions stated in his/her own policy. In this instance, the user who generated the policy could be the policy owner. Further, an asset owner could delegate policy generation/ownership to an agent in various ways. Ownership of an asset can be transferred using this process by generation of an owner policy be the current owner. The asset changes ownership, owner policy parameters, and removes all policies generated by the previous (formerly the current) owner.

At 305, the user and the asset conduct a handshake and at 306, the user transfers the encrypted and signed policy from the owner to the asset. The asset can then verify the signature and decrypt the policy. The asset also retrieves the fingerprint of the new user along with its restrictions and retrieves the shared secret between the new user and the asset set by the policy owner. After this point, the user can access the asset like any other user of the system. In the case of a connected asset, a notification can be sent back to the policy owner indicating that the new user has been configured on the asset.

310 illustrates a data structure stored by the asset at this point, including the user ID, user fingerprint, and shared secret. 320 illustrates a data structure stored by the user device at this point, including the asset ID, asset fingerprint, and shared secret. 330 illustrates a data structure stored by the system at this point, including the user ID, user fingerprint, and policy. Although the two phases discussed above should occur in sequence, there can be any amount of time in between them. For example, the second phase could occur immediately after, or many days, months, or even years after, the first phase.

Note that the shared secret between the user and the asset in this example is determined by the policy owner. For convenience, the shared secret between the policy owner and user can be used as the shared secret between user and the asset as well. Also, in the offline mode, the implementation can ignore the presence of the cloud altogether. In the online mode, the cloud acts as an intermediate relay. Note that no shared secret is stored on the cloud system.

Figure 4:
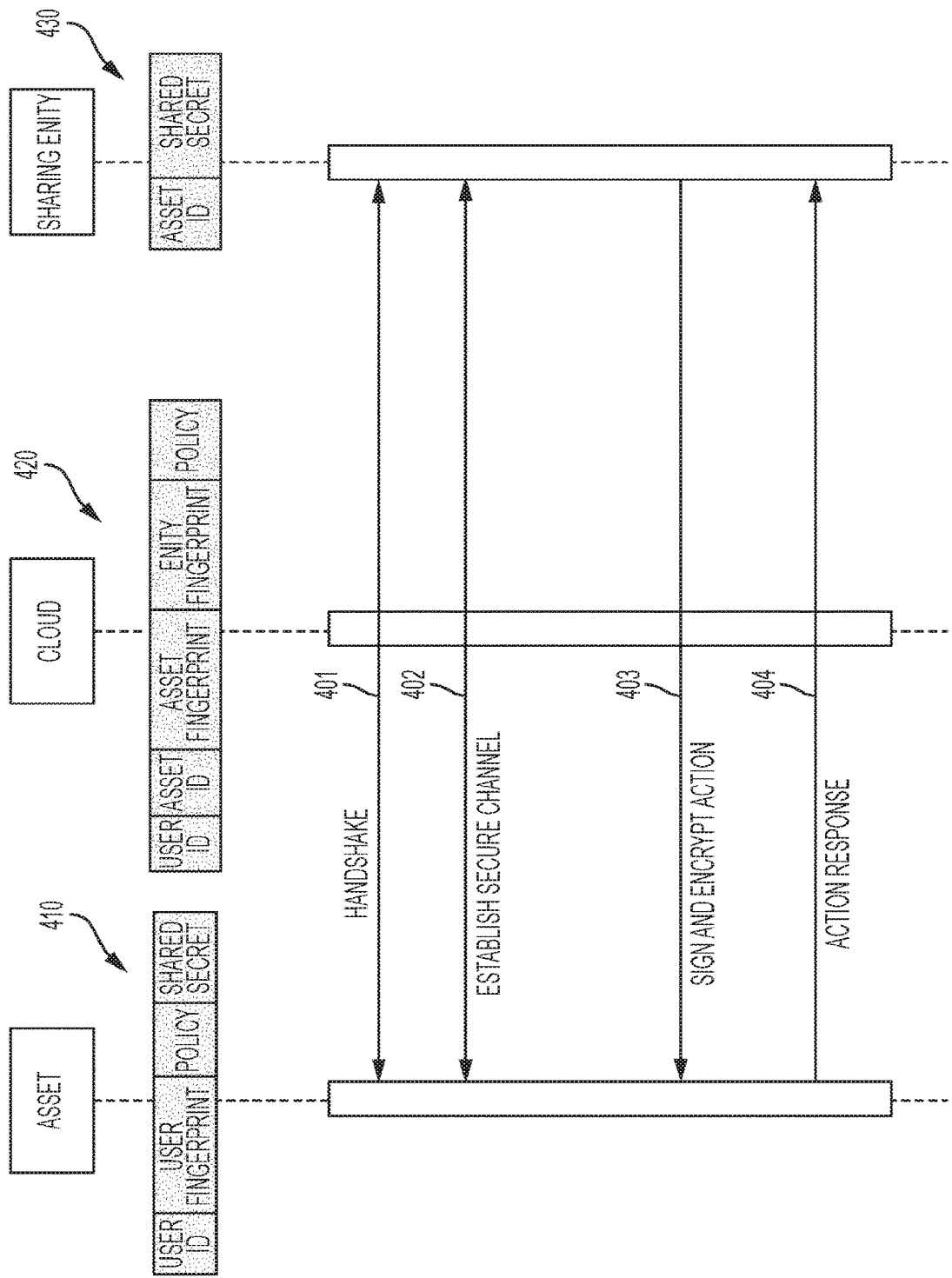
FIG. 4 is a data flow diagram of an asset access operation of an embodiment.

FIG. 4 illustrates the function and data flow for an operation of a system user ("sharing entity") accessing the asset. At 401, the sharing entity and the asset perform a communication handshake which can be over an unsecure communication channel. At 402, the sharing entity and the asset use the pre-established shared secret to create a secure channel. After verification through some type of some challenge response mechanism, the sharing entity encrypts and signs a requested action and sends the result to the asset at 403. After verifying the validity of the signature and consulting the policy assigned to the sharing entity, at 404 the asset performs the requested action if it is permitted by the policy or denies the requested action if it is not permitted by the policy. Optionally the asset can send a notification to the policy owner about the action performed or the denial of the request. As an example, the use case for online mode can be remotely starting a vehicle engine, or unlocking a house door for guests or a delivery person. The above process can be used for accessing and also be used to revoke policies. A policy owner can send a request to the asset to remove/change a policy belonging to an entity previously authorized by the policy owner. By removing a policy, all policies generated by the removed entity can also be removed.

The functions above were described with respect to sharing entities, i.e. users that participate in the sharing system. However, parties outside of the sharing system, referred to as "third parties" herein can also use the system to access resources. Sharing entities can all have access to the same mobile application. This is not a restriction as their intended use of the asset is long-term. However, for cases where access is granted to the asset for a short time, or even one-time access, it might not be possible or convenient for the third party to acquire the mobile application.

Third parties can be given access to the asset using an NFC card or other token. In this case the asset may be placed in a special mode which provides only very restricted and time limited access. The third party will have the limited access upon Possessing the NFC card or other token in proximity to the asset. The asset can be restored to its normal mode when one of the sharing entities, or the owner starts utilizing the asset by identifying themselves. Note that the use of NFC or a mobile device in the embodiment is simply to authenticate the user to the asset. After authentication, the asset retrieves the policy associated to the user. In the case of a valet or any other temporary user, there will still be a policy that restricts the access to the asset. The NFC/possession of the mobile device is used to retrieve that policy as a means of authentication in the embodiment.

Figure 5:
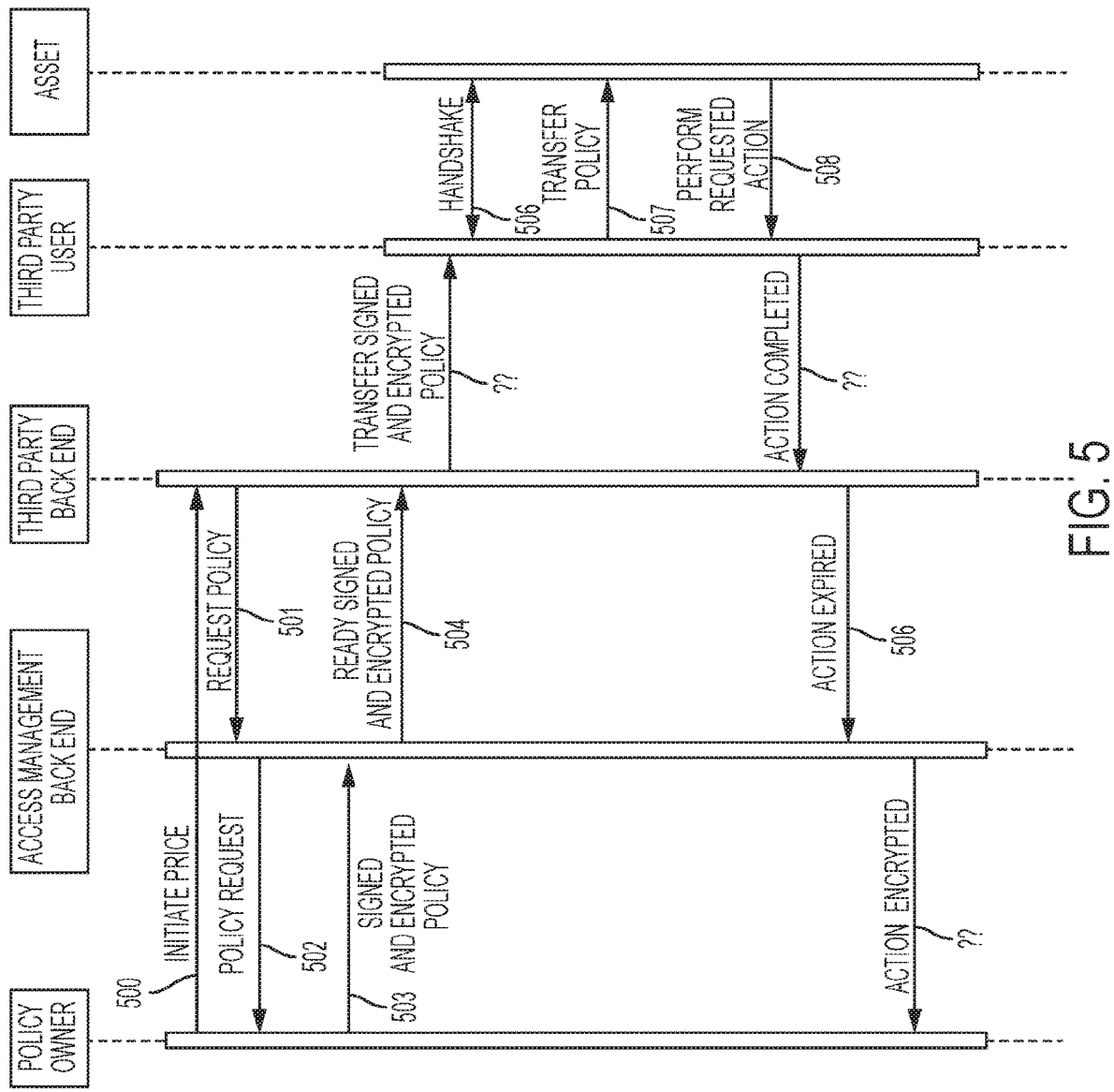
FIG. 5 is a data flow diagram of a third-party asset access operation of an embodiment.

Another third-party alternative is illustrated in FIG. 5. This alternative can be used, for example, where the access to the asset is requested by a third party, such as package delivery personnel. At 500, the policy owner makes a request for service (e.g., a trunk request on a merchant website) to a third-party backend. In 501 access management backend is notified by the third-party backend of a request by some user. In 502 the backend sends a confirmation/policy request to the user. User verifies the request and generates a policy to grants the access to the asset. In 503 the policy is encrypted and signed through shared secret between the user and the asset and sent to the access management backend. The protected policy is sent to the third-party backend at 504 and then to the third-party user at 505. Just like policy sharing, in 506-508 the temporary user approaches the asset, relay the received protected policy to the asset. Asset verifies the validity of the signature and policy and grants access based on the received policy. Retention of the policy is defined in the policy itself and is enforced by the asset. Something that might be confusing between this case and the next is the presence of the policy owner in the scenario. In the current case, the policy owner is present on the scene (valet is parking the car but the legitimate driver or the policy owner is still present). In the next scenario, the policy owner is not present so we need a different mechanism for authenticating the third-party. In the next scenario, the third party also has an app which is meant for the entity to carry out his/her duties but is different from the app used by the long-term entity.

The embodiments described above are general. An embodiment directed to a more specific use case, offline vehicle access and key sharing, is described below. In this embodiment, there can be a trusted entity, such as dealership representative, that initializes the key setup by putting the vehicle in a specific state. Also, the owner of the vehicle, or an agent thereof, has the key sharing app on their computing device, such as a mobile phone.

Figure 6:
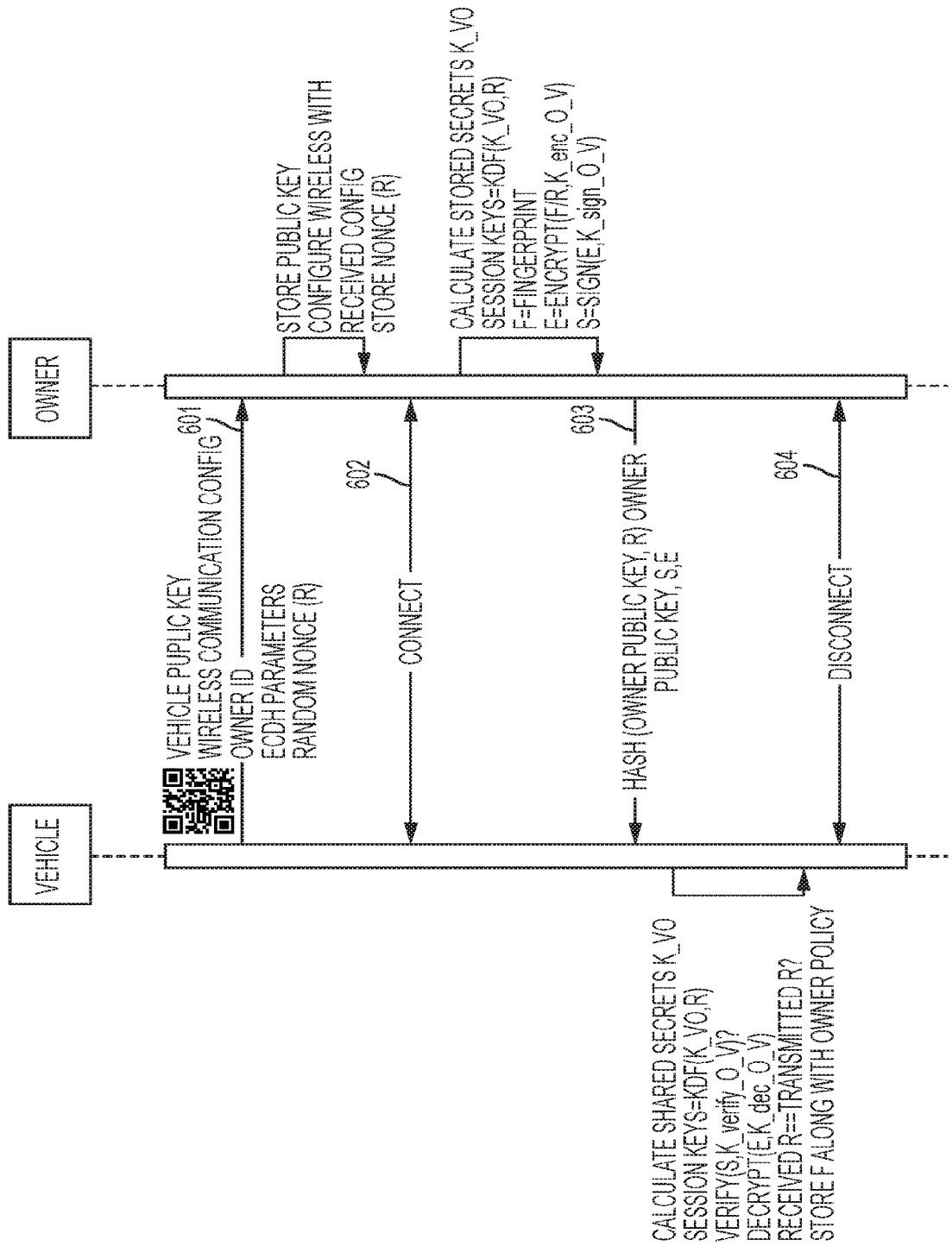
FIG. 6 is a data flow diagram of an initial setup operation in a vehicle sharing use case of an embodiment.

As shown in FIG. 6, the vehicle displays a visual indicator (e.g., a QR code on the body of the vehicle) for the owner to scan, at 601. A communication channel is established between the owner and the vehicle at 602. This visual indicator can include a cryptographic challenge (e.g., a nonce), the vehicle's public key and some communication configurations such as a BLE unique service ID. The Owner device calculates the shared secret for this session by using cryptographic algorithms such as ECDH. From the shared secret, session keys are derived. The owner device then encrypts a function of its fingerprint and received nonce, and cryptographically signs the encrypted message. At 603, the owner device sends its public key, a hash of its public key and a nonce and the protected fingerprint to the vehicle device.

The Vehicle then calculates the same shared secret and appropriate session keys, verifies the message signature, decrypts the message and verifies the nonce. If all the checks above pass, the vehicle stores the fingerprint of the owner along with its default no-restriction policy. Note that there is no need to communicate anything back to the owner, as the owner already knows its role in this protocol, so the devices can disconnect at 604. As a result, both entities (vehicle and owner) were able to establish some shared secrets and cryptographic keys, and a policy has been assigned to the owner and bound to the owner device fingerprint.

Figure 7:
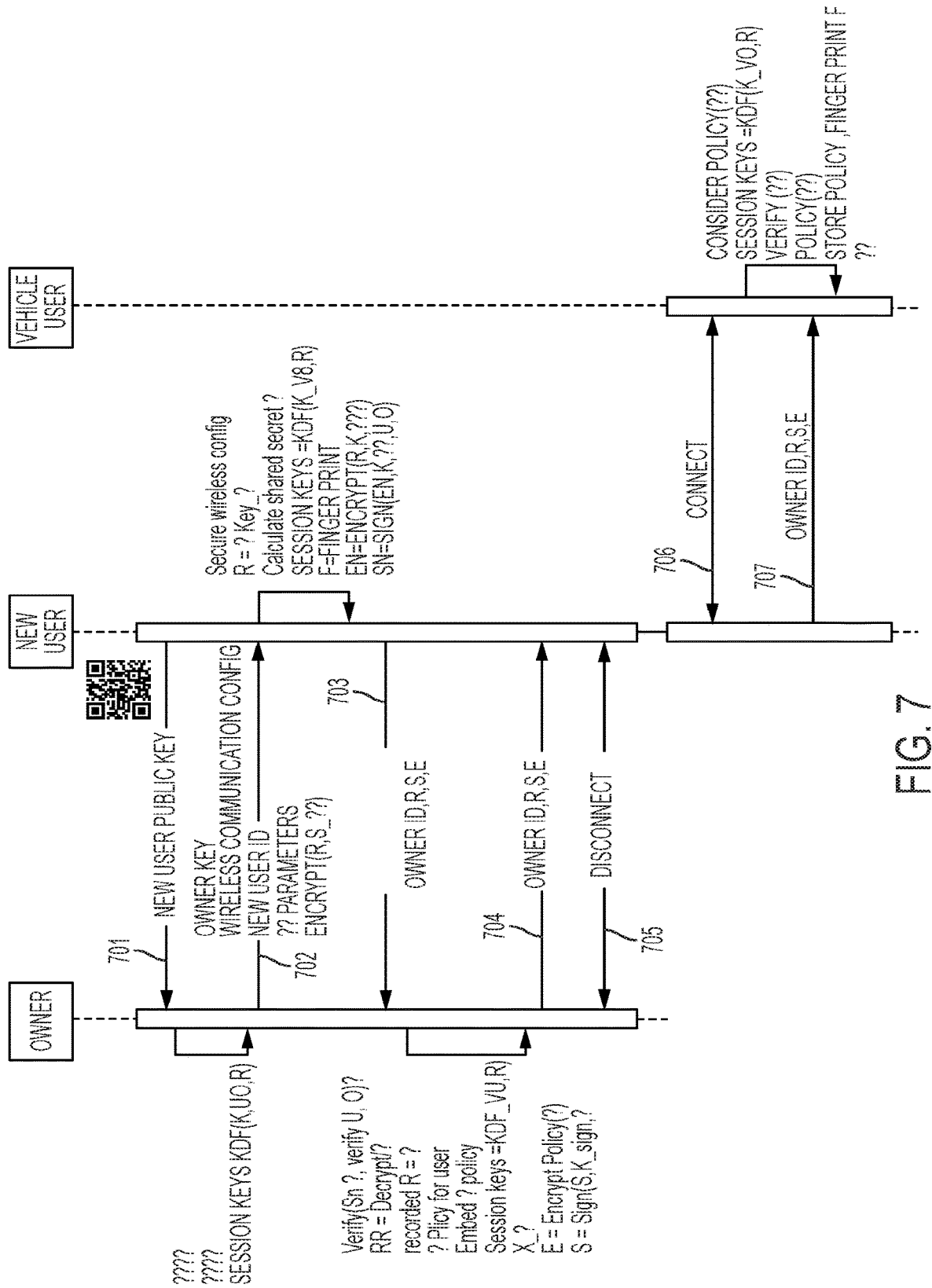
FIG. 7 is a data flow diagram of a policy transfer operation in a vehicle sharing use case of an embodiment.

The key sharing function can be divided into two sequential phases: (1) Owner transfers a policy to the new user and (2): New user relays the transferred policy to the vehicle. As illustrated in FIG. 7, to transfer a policy from a policy owner to a user, the user passes their public key to the owner through a QR code. The policy owner then generates the shared secret as a function of its private key and the received public key at 701. The policy owner prepares a packet for the new user containing, the owner public key and its hash with a random nonce, a nonce by encrypted by the users' public key, and configurations needed to communicate to the vehicle. The packet is sent to the user at 702. The user decrypts the nonce, generates the shared secret using its private key and received public key of the owner, and, at 703, sends to the owner the encrypted function of its fingerprint along with the received nonce, and a cryptographically signed version of the above encrypted message.

The owner then verifies the signature, decrypts the fingerprint and generates a policy bound to the fingerprint and according to the restrictions desired. The owner encrypts the policy along with the shared secret between the owner and the user using the shared secret between the owner and the vehicle. The owner cryptographically signs the encrypted message using the appropriate key derived from the same shared secret. The shared secret between the owner and the user can be used as the shared secret between the user and the vehicle. At 704, the owner sends the above encrypted and signed messages to the new user and, disconnects at 705.

At 706, the user communicates with the vehicle using the received configurations from the owner. At 707, the user transfers the encrypted and signed policy obtained above from the owner to the vehicle and the vehicle verifies the signature and decrypts the policy. The vehicle device also retrieves the fingerprint of the new user along with its restrictions and retrieves the shared secret between the new user and the owner. This shared secret will be used for the first time between the new user and the vehicle as well. At this time, the new user can proceed by making action requests to the vehicle like any other user and the vehicle device permits or denies the action based on the policy. Examples of the requested action can be: open door/trunk/glovebox, start engine or even revoke a policy (which is only granted to the owner).

Figure 8:
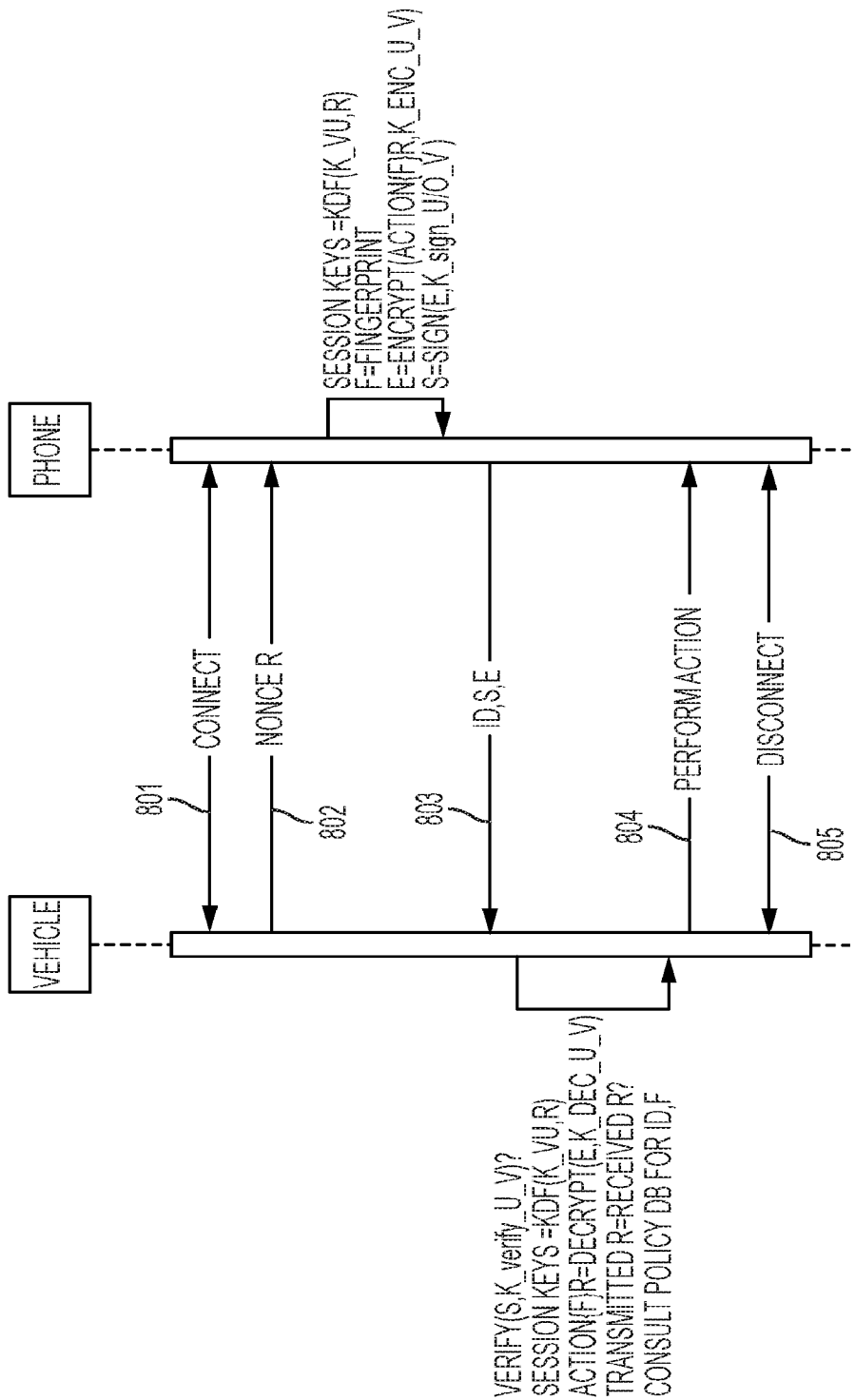
FIG. 8 is a data flow diagram of an asset access operation in a vehicle sharing use case of an embodiment.

FIG. 8 illustrates the user request function. In this example, the device associated with the user is the user's mobile phone. At 801, the vehicle device starts the protocol by sending a nonce to the user at 802. The user encrypts the desired action along with its fingerprint and the received nonce, signs the encryption and sends it to the vehicle at 803. The vehicle device verifies the signature, verifies the nonce and the fingerprint of the user, consults the policy database to verify if the user is permitted to make the action request. If all checks pass, vehicle executes the action requested by the user at 804 and then disconnects at 805.

As noted above, the policy can be expressed in various manners. Regardless of the manner of expression, a policy can be stored on non-transient computer readable media as a data structure and can include the following fields:

User Preferences: this will include user setting either being set on the asset directly or being synched from users' device(s). For instance, in the case of a vehicle, user preferences can include HVAC, mirror and seat setting, preferred radio stations, as well as personal credit cards, playlist, etc. synched from the phone.

Restrictions: this will include any limitation about the access to the asset. For instance, in the case of a vehicle these restrictions might be: time of day/day of week allowance, speed and range limitations, physical access restrictions such as doors, trunk, glovebox, geo fencing, etc.

Validity: will include time stamp for when the policy was created and when it will expire. It can also indicate if the policy is meant to be used only once Management: this will include all restrictions about policy creation; is the user allowed to create policies, if yes what are the restrictions on the created policy Authentication: does the user require two factor authentications (tough ID, NFC card, etc.), device fingerprint (s), etc.

History: this will include the authorizing policy (parent) and all the authorized policies (children)

Glossary

Asset: physical or conceptual medium that is to be shared. Examples include, a building, IoT device (for physical examples) or a computer program (for a conceptual instance).

Sharing entity: physical (e.g., persons) or conceptual (e.g., computer programs) entities that want to have shared access to the same asset but with different levels of access.

Policy: a set of rules and or conditions to grant/limit access to an asset. A policy can be generated by an entity and can be enforced by the asset. A policy can also include rules about generating and revoking subsequent policies.

Policy Owner: this is the entity generating the policy. He/she might be the owner of the asset or just a sharing entity receiving his access directly or indirectly from the asset owner.

Policy Management: this refers to creating, editing and revoking policies. Policy owners can revoke the immediate policies they have created as well as all policies created through their policy for an unlimited number of levels. For instance, if a vehicle owner grants his teenager policy creation, and the teenager generates a policy for his friend, then the friend's policy can be revoked by the teenager (policy owner) as well as the owner (as he owns the policy to the teenager).

The methods described herein have been shown as individual steps carried out in a specific order. However, the skilled person will appreciate that these steps may be combined or carried out in a different order to achieve the desired result. The embodiments and examples may be implemented using a variety of different information processing devices, architectures and encryption algorithms. In particular, although the disclosure herein provides an exemplary computing system and methods, these are presented merely to provide a useful reference in discussing various aspects of the invention. may be carried out on any suitable data processing devices, such as a personal computer, laptop, personal digital assistant, mobile phone, and/or dedicated computing device.

Embodiments can be implemented by a computer program stored on non-transient media. The stored computer program may have one or more program instructions, or program code, which, when executed by one or more computer processors, carries out the disclosed functions. The term "program" as used herein, may be a sequence of—instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc.

The parties have been described as "owner", "user", and the like for descriptive purposes. However, these labels do not require any specific legal relationship. For example, the "owner" of an asset need not be the legal owner but can be a party that is an agent of the legal owner or otherwise has rights to grant policies to users. Also, as noted above, the entities and the computing devices associated with the entities have been discussed together. Of course, computing tasks disclosed as accomplished by an entity are accomplished computing device(s) associated with that entity.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A method implemented by one or more computing devices for managing use of an asset, the method comprising:
   accomplishing a registration procedure between an asset device physically coupled with an asset and an owner device associated with an owner of the asset;
   transmitting a secure policy associated with a user from a policy owner device to a user device associated with the user, wherein the secure policy includes policy attributes defining conditions and limitations for controlling use of the asset and is distinct from cryptographic keys used to secure the communication to the asset;
   transmitting the secure policy from user device to the asset device;
   requesting, by the user device, a specified use of the asset; and
   enforcing the policy by the asset device whereby the request is granted only when the requested use corresponds to the policy attributes in the policy.

2. The method of claim 1, wherein the secure policy is bound to a fingerprint of the user device and further comprising the policy owner device encrypting and signing the policy.

3. The method of claim 2, wherein the policy owner device is controlled by the owner of the asset.

4. The method of claim 2, wherein the policy owner device is controlled by a party other than the owner of the asset who has been given rights to create policies.

5. The method of claim 2, wherein the asset device stores a data structure including a user ID, a user fingerprint, access policy attributes, and a shared secret with the owner device, and wherein the owner device stores a data structure including an asset ID, an asset fingerprint, access policy attributes, and the shared secret.

6. The method of claim 2, wherein the user device stores a data structure including an asset ID, and asset fingerprint, and a shared secret with the policy owner.

7. The method of claim 2, wherein the use of the asset includes physical access to an interior of the asset.

8. The method of claim 2, wherein the asset is a computing resource and the use includes access to the computing resource.

9. The method of claim 1, wherein the registration procedure comprises:
   exchanging public keys between the owner device and the asset device, the public keys being signed by a certificate authority with a certificate of identity;
   deriving a shared secret; and
   protecting communications between the owner device and the asset device by encrypting and signing the communication using the public keys and the shared secret.

10. An apparatus for managing use of an asset, the apparatus comprising:
    at least one computer processor;
    at least one memory device coupled to the at least one computer processor and storing instructions thereon which, when executed by the at least one processor, cause the at least one processor to:
       accomplish a registration procedure between an asset device physically coupled with an asset and an owner device associated with an owner of the asset;
       transmit a secure policy associated with a user from a policy owner device to a user device associated with the user, wherein the secure policy includes policy attributes defining conditions and limitations for controlling use of the asset and is distinct from cryptographic keys used to secure the communication to the asset;
       transmit the secure policy from user device to the asset device;
       request, by the user device, a specified use of the asset; and
       enforcing the policy by the asset device whereby the request is granted only when the requested use corresponds to policy attributes in the policy.

11. The apparatus of claim 10, wherein the secure policy is bound to a fingerprint of the user device and further comprising the policy owner device encrypting and signing the policy.

12. The apparatus of claim 10, wherein the policy owner device is controlled by the owner of the asset.

13. The apparatus of claim 10, wherein the policy owner device is controlled by a party other than the owner of the asset who has been given rights to create policies.

14. The apparatus of claim 10, wherein the asset device stores a data structure including a user ID, a user fingerprint, access policy attributes, and a shared secret with the owner device, and wherein the owner device stores a data structure including an asset ID, an asset fingerprint, access policy attributes, and the shared secret.

15. The apparatus of claim 10, wherein the user device stores a data structure including an asset ID, and asset fingerprint, and a shared secret with the policy owner.

16. The apparatus of claim 10, wherein the use of the asset includes physical access to an interior of the asset.

17. The apparatus of claim 10, wherein the asset is a computing resource and the use includes access to the computing resource.

18. The apparatus of claim 10, wherein the registration procedure comprises:
- exchanging public keys between the owner device and the asset device, the public keys being signed by a signed by a certificate authority with a certificate of identity;
- deriving a shared secret; and
- protecting communications between the owner device and the asset device by encrypting and signing the communication using the public keys and the shared secret.

* * * * *